(12) United States Patent
Cai

(10) Patent No.: US 11,445,410 B2
(45) Date of Patent: Sep. 13, 2022

(54) WIRELESS COMMUNICATION SERVICE DELIVERY RESPONSIVE TO USER EQUIPMENT (UE) HANDOVERS

(71) Applicant: T-Mobile Innovations LLC, Overland Park, KS (US)

(72) Inventor: Zheng Cai, Fairfax, VA (US)

(73) Assignee: Sprint Communications Company L.P., Overland Park, KS (US)

( * ) Notice: Subject to any disclaimer, the term of this patent is extended or adjusted under 35 U.S.C. 154(b) by 53 days.

(21) Appl. No.: 17/154,494

(22) Filed: Jan. 21, 2021

(65) Prior Publication Data
US 2022/0232428 A1  Jul. 21, 2022

(51) Int. Cl.
*H04W 36/00* (2009.01)
*H04M 15/00* (2006.01)
*H04W 76/27* (2018.01)
*H04W 80/02* (2009.01)
*H04W 60/04* (2009.01)

(52) U.S. Cl.
CPC ....... *H04W 36/0009* (2018.08); *H04M 15/66* (2013.01); *H04W 36/0033* (2013.01); *H04W 60/04* (2013.01); *H04W 76/27* (2018.02); *H04W 80/02* (2013.01)

(58) Field of Classification Search
CPC ......... H04W 36/0009; H04W 36/0033; H04W 60/04; H04W 76/27; H04W 80/02; H04M 15/66
See application file for complete search history.

(56) References Cited

U.S. PATENT DOCUMENTS

| | | | |
|---|---|---|---|
| 7,693,093 | B2 | 4/2010 | Riedel et al. |
| 8,194,615 | B2 | 6/2012 | Sayeedi et al. |
| 8,346,260 | B2 | 1/2013 | Kim et al. |
| 9,113,381 | B2 | 8/2015 | Jung et al. |
| 9,237,488 | B2 | 1/2016 | Lee et al. |
| 9,924,402 | B2 | 3/2018 | Klingenbrunn et al. |
| 2018/0192471 | A1* | 7/2018 | Li .................... H04W 28/02 |
| 2018/0199398 | A1* | 7/2018 | Dao .................. H04L 65/1069 |
| 2019/0215735 | A1 | 7/2019 | Wang et al. |

(Continued)

OTHER PUBLICATIONS

"3rd Generation Partnership Project; Technical Specification Group Services and System Aspects; Security architecture and procedures for 5G system (Release 15)"; 3GPP TS 33.501; Dec. 2020; pp. 1-193; V15.11.0; 3GPP; France.

(Continued)

*Primary Examiner* — Hassan Kizou
*Assistant Examiner* — Abdullahi Ahmed

(57) ABSTRACT

A wireless communication system delivers a wireless data service to User Equipment (UE) responsive to a handover. A Centralized Unit (CU) transfers a handover registration to a Network Repository Function (NRF). A Session Management Function (SMF) transfers a handover subscription for the UE to the NRF. The CU detects a handover of the UE and responsively transfers a handover notice for the UE to the NRF. In response to the handover subscription for the UE from the SMF, the NRF transfers the handover notice for the UE to the SMF. The SMF modifies the wireless data service for the UE responsive to the handover notice for the UE. For example, the SMF may implement data encryption for the UE responsive to the handover.

20 Claims, 9 Drawing Sheets

(56) References Cited

U.S. PATENT DOCUMENTS

| | | | |
|---|---|---|---|
| 2020/0053617 A1* | 2/2020 | Park | H04W 36/14 |
| 2020/0112907 A1* | 4/2020 | Dao | H04M 15/84 |
| 2020/0120570 A1* | 4/2020 | Youn | H04W 76/11 |
| 2020/0359291 A1* | 11/2020 | Ramle | H04W 36/0055 |
| 2020/0404729 A1* | 12/2020 | Mildh | H04W 68/005 |
| 2021/0258766 A1* | 8/2021 | Watanabe | H04W 36/0022 |
| 2021/0360392 A1* | 11/2021 | Xu | H04W 8/26 |

OTHER PUBLICATIONS

"3rd Generation Partnership Project; Technical Specification Group Services and System Aspects; Study on the security of Ultra-Reliable Low-Latency Communication (URLLC) for the 5G System (5GS) (Release 16)"; 3GPP TR 33.825; Oct. 2019; pp. 1-29; V16.0.1; 3GPP; France.

"3rd Generation Partnership Project; Technical Specification Group Radio Access Network; NR; NR and NG-RAN Overall Description; Stage 2 (Release 16)"; 3GPP TS 38.300; Dec. 2020; pp. 1-149; V16.4.0; 3GPP; France.

\* cited by examiner

WIRELESS COMMUNICATION SERVICE DELIVERY RESPONSIVE TO USER EQUIPMENT (UE) HANDOVERS

TECHNICAL BACKGROUND

Wireless communication networks provide wireless data services to wireless user devices. Exemplary wireless data services include machine-control, internet-access, media-streaming, and social-networking. Exemplary wireless user devices comprise phones, computers, vehicles, robots, and sensors. The wireless communication networks have wireless access nodes which exchange wireless signals with the wireless user devices over radio frequency bands. The wireless signals use wireless network protocols like Fifth Generation New Radio (5GNR), Millimeter Wave (MMW), Long Term Evolution (LTE), Institute of Electrical and Electronic Engineers (IEEE) 802.11 (WIFI), and Low-Power Wide Area Network (LP-WAN). The wireless access nodes exchange network signaling and user data with network elements that are often clustered together into wireless network cores. The wireless access nodes are connected to the wireless network cores over backhaul data links.

The wireless access nodes comprise Radio Units (RUs), Distributed Units (DUs) and Centralized Units (CUs). The RUs are mounted at elevation and have antennas, modulators, signal processor, and the like. The RUs are connected to the DUs which are usually nearby network computers. The DUs handle lower wireless network layers like the Physical Layer (PHY) and Media Access Control (MAC). The DUs are connected to the CUs which are larger computer centers that are closer to the network cores. The CUs handle higher wireless network layers like the Radio Resource Control (RRC) and Packet Data Convergence Protocol (PDCP). The CUs are coupled to network elements in the network cores like Access and Mobility Management Functions (AMFs) and User Plane Functions (UPFs).

The wireless user devices and the RUs wirelessly exchange data. The RUs and the DUs exchange the data, and the DUs and the CUs exchange the data. The CUs and the UPFs exchange the data, and the UPFs exchange the data with external systems like the internet. The AMFs and the CUs exchange signaling to control the CUs, DUs, RUs, and wireless user devices. The SMFs and the UPFs exchange signaling to control the UPFs. The AMFs and SMFs control the Quality-of-Service (QoS) for the data sessions. The CUs control handovers of the wireless user devices among the RUs as the wireless user devices move about.

The wireless network cores have Network Repository Functions (NRFs) that serve the network functions like the SMFs, AMFs, and UPFs. The NRFs host network function registries that allow the network functions to discover and contact one another in an efficient and secure manner. The NRFs also serve event registrations and subscriptions where some network functions post events, and other network functions subscribe to the postings. Unfortunately, the NRFs and the CUs do not interact. Moreover, the network functions like the SMF and the UPF do not effectively optimize their data sessions based on handover events in the CUs.

TECHNICAL OVERVIEW

A wireless communication system delivers a wireless data service to User Equipment (UE) responsive to a handover. In a Radio Access Network (RAN), a RAN Centralized Unit (CU) transfers a handover registration to a Network Repository Function (NRF). A Session Management Function (SMF) transfers a handover subscription for the UE to the NRF. The RAN CU detects a handover of the UE and responsively transfers a handover notice for the UE to the NRF. In response to the handover subscription for the UE from the SMF, the NRF transfers the handover notice for the UE to the SMF. The SMF modifies the wireless data service for the UE responsive to the handover notice for the UE. For example, the SMF may implement data encryption for the UE responsive to the handover.

DETAILED DESCRIPTION

Figure 1:
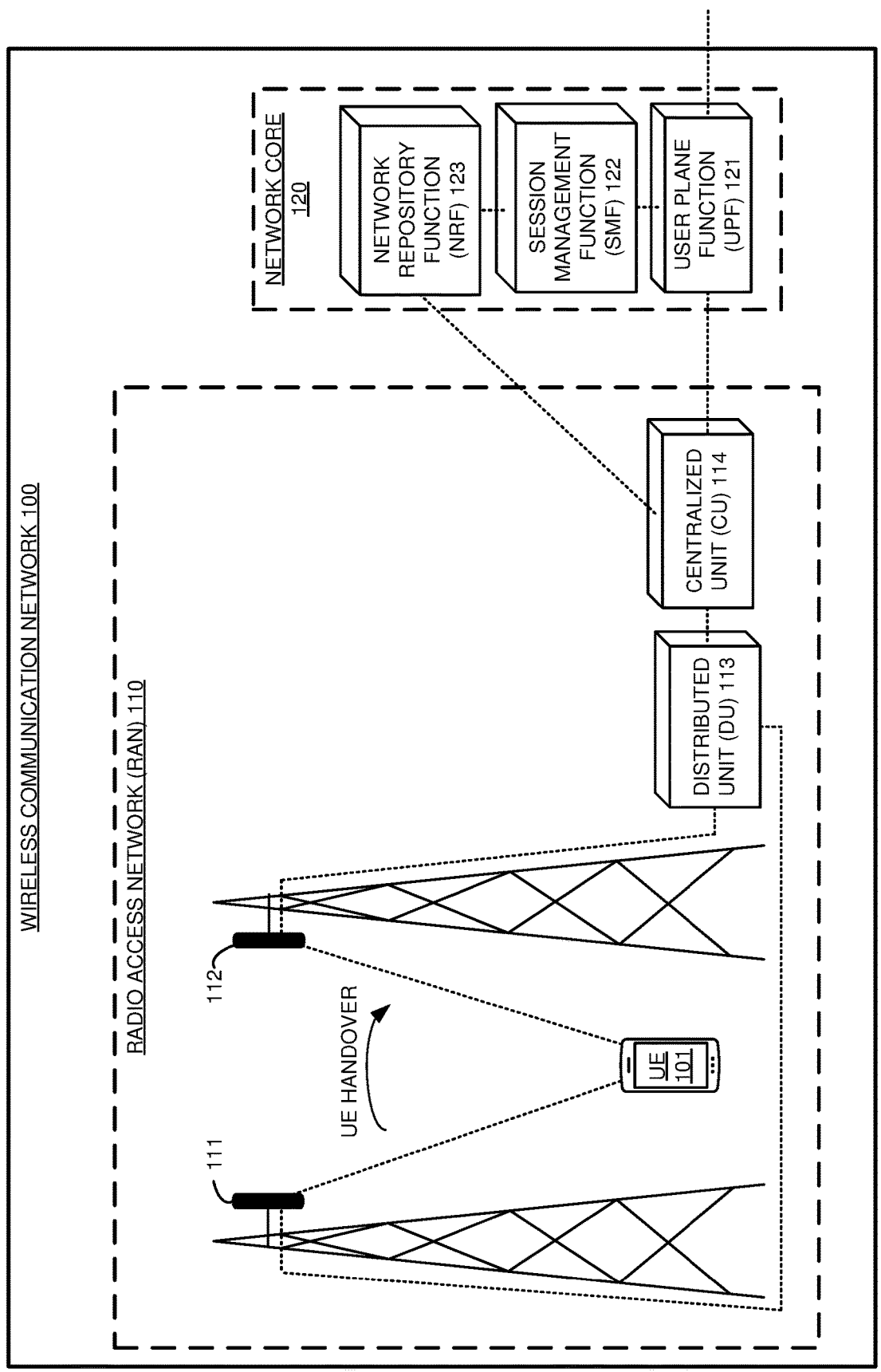
FIG. 1 illustrates a wireless communication network to deliver a wireless data service to User Equipment (UE) responsive to a handover of the UE.

FIG. 1 illustrates wireless communication network 100 to deliver a wireless data service to User Equipment (UE) 101 responsive to a handover. Wireless communication network 100 comprises wireless UE 101, Radio Access Network (RAN) 110, and wireless network core 120. RAN 110 comprises Radio Units (RUs) 111-112, Distributed Unit (DU) 113, and Centralized Unit (CU) 114. Wireless network core 120 comprises User Plane Function (UPF) 121, Session Management Function (SMF) 122, and Network Repository Function (NRF) 123. The number of UEs, RANs, and cores that are depicted on FIG. 1 has been restricted for clarity, and wireless communication network 100 may comprise many more UEs, RANs, cores, and other functions.

Various examples of network operation and configuration are described herein. In some examples, CU 114 registers with NRF 123 to report handover events for RUs and UEs. Initially, UE 101 communicates with external systems over RU 111, DU 113, CU 114, and UPF 121. In network core 120, SMF 122 controls UPF 121 to serve UE 101, and in response, SMF 122 transfers a handover subscription for UE 101 to NRF 123. Possibly due to UE mobility, RU 111 hands UE 101 over to RU 112. After the handover, UE 101 communicates over RU 112, DU 113, CU 114, and UPF 121. CU 114 detects the handover of UE 101 to RU 112 and responsively transfers a handover notice for UE 101 and RU 112 to NRF 123. In response to the handover subscription for UE 101, NRF 123 transfers the handover notice for UE 101 and RU 112 to SMF 122. SMF 122 modifies the wireless data service for UE 101 responsive to the handover notice to RU 112. For example, SMF 122 may direct UPF 121 to encrypt user data for UE 101 after the handover to RU 112. SMF 122 may initiate a policy change by modifying the Quality-of-Service (QoS) through a (Protocol Data Unit (PDU) session modification in another example.

Advantageously, NRF 123 effectively interacts with CU 114 and SMF 122 to establish handover event reporting for UE 101 from CU 114 to SMF 122. Moreover, SMF 122 and UPF 121 efficiently optimize the data session for UE 101 based on handover events detected by CU 114. SMF 122 may interact with a Policy Control Function (PCF) to implement new policies for UE 101 responsive to the handover to RU 112. For example, the PCF may direct SMF 422 to burst user data for a time period. CU 114 may detect and report handovers for specific RUs or sets of RUs. Likewise, NRF 123 may report handovers for specific UEs or sets of UEs.

UE 101 and RUs 111-112 wirelessly communicate over wireless links using Radio Access Technologies (RATs) like Fifth Generation New Radio (5GNR), Long Term Evolution (LTE), Institute of Electrical and Electronic Engineers (IEEE) 802.11 (WIFI), Low-Power Wide Area Network (LP-WAN), and/or some other wireless protocol. The RATs use electromagnetic frequencies in the low-band, mid-band, high-band, or some other portion of the electromagnetic spectrum. RUs 111-112 and DU 113 communicate over fronthaul links. DU 113 and CU 114 communicate over mid-haul links. CU 114 and UPF 121 communicate over backhaul links. UPF 121 and external systems communicate over external links. These links use metallic links, glass fibers, radio channels, or some other communication media. The links use IEEE 802.3 (Ethernet), Time Division Multiplex (TDM), Data Over Cable System Interface Specification (DOCSIS), Internet Protocol (IP), General Packet Radio Service Transfer Protocol (GTP), 5GNR, LTE, WIFI, virtual switching, inter-processor communication, bus interfaces, and/or some other data communication protocols.

Although UE 101 is depicted as a smartphone, UE 101 might instead comprise a vehicle, sensor, robot, computer, or some other data appliance with wireless communication circuitry. RUs 111-112 are depicted as towers but RUs 111-112 may use other mounting structures or no mounting structure at all. RAN 110 may comprise gNodeBs, eNodeBs, NB-IoT access nodes, LP-WAN base stations, wireless relays, and/or some other wireless network transceivers. UE 101 and RUs 111-112 comprise antennas, amplifiers, filters, modulation, and analog/digital interfaces. UE 101, RAN 110, and network core 120 comprise microprocessors, software, memories, transceivers, bus circuitry, and the like. The microprocessors comprise Digital Signal Processors (DSP), Central Processing Units (CPU), Graphical Processing Units (GPU), Application-Specific Integrated Circuits (ASIC), and/or the like. The memories comprise Random Access Memory (RAM), flash circuitry, disk drives, and/or the like. The memories store software like operating systems, user applications, radio applications, and network functions. The microprocessors retrieve the software from the memories and execute the software to drive the operation of wireless communication network 100 as described herein.

Figure 2:
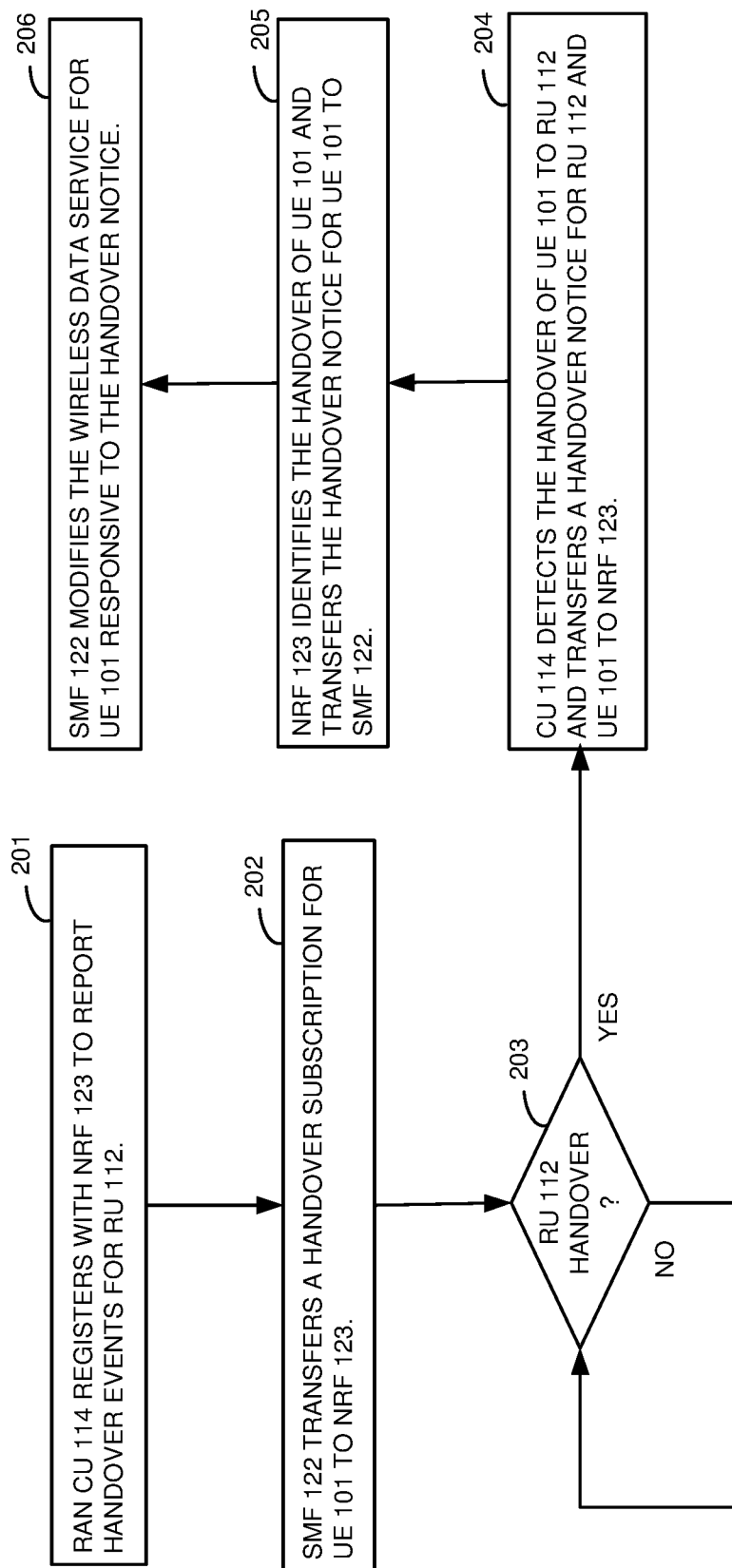
FIG. 2 illustrates the operation of the wireless communication network to deliver the wireless data service the UE responsive to a handover.

FIG. 2 illustrates the operation of wireless communication network 100 to deliver the wireless data service to UE 101 responsive to the handover of UE 101. This particular operation is exemplary and may vary in other examples. CU 114 registers with NRF 123 to report handover events for RU 112 (201). SMF 122 transfers a handover subscription for UE 101 to NRF 123 (202). When RU 112 accepts a handover (203), CU 114 detects the handover and transfers a handover notice for RU 112 to NRF 123 and the handover notices identifies UE 101 (204). In response to the handover subscription for UE 101 and the handover notice, NRF 123 transfers the handover notice for UE 101 and RU 112 to SMF 122 (205). SMF 122 modifies the wireless data service for UE 101 responsive to the handover notice (206). For example, SMF 122 may interact with a Policy Control Function (PCF) to identify a new encryption policy for UE 101 responsive to a handover to RU 112, and SMF 122 would then instruct UPF 121 to encrypt/decrypt user data for UE 101 per the new policy.

Figure 3:
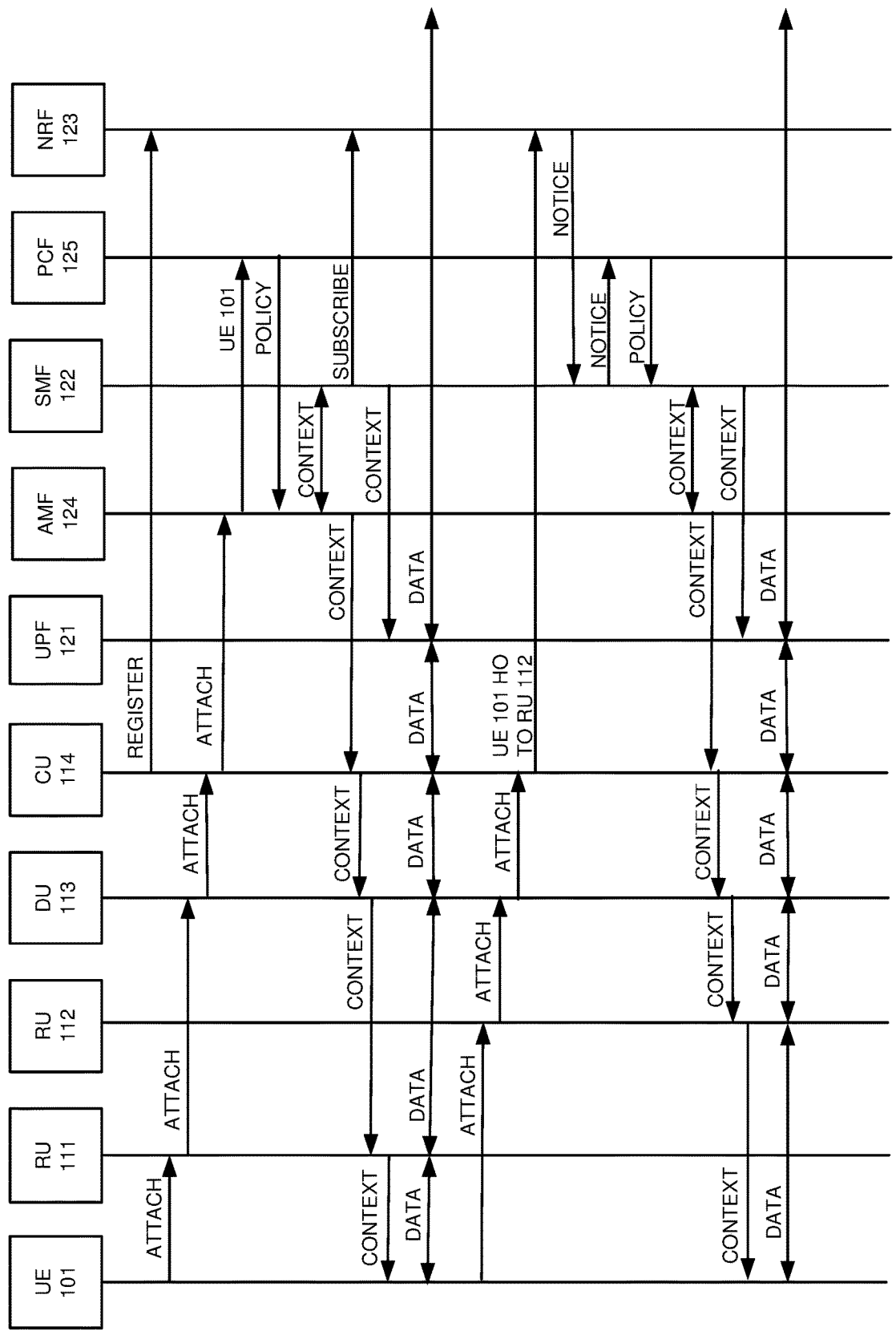
FIG. 3 illustrates the operation of the wireless communication network to deliver the wireless data service the UE responsive to a handover.

FIG. 3 illustrates the operation of wireless communication network 100 to deliver the wireless data service to UE 101 responsive to the handover of UE 101. This particular operation is exemplary and may vary in other examples. In this example, Access and Mobility Management Function (AMF) 124 and Policy Control Function (PCF) 125 are included but are not required in other examples.

CU 114 registers with NRF 123 to report handover events for RU 112. UE 101 transfers attachment signaling to RU 111. RU 111 transfers corresponding attachment signaling to DU 113. DU 113 transfers corresponding attachment signaling to CU 114. CU 114 transfers corresponding attachment signaling to AMF 124. AMF 124 and SMF 122 exchange UE context and SMF 122 typically adds UPF selections and network addresses. SMF 122 queries PCF 125 for policies for UE 101, and PCF 125 returns policies for UE 101 to SMF 124. SMF 122 and AMF 124 process the policies to further develop the UE context for UE 101 like adding Quality-of-Service (QoS), network names, and network slices. In response to the UE context for UE 101, SMF 122 subscribes to handover events for UE 101 from NRF 123. SMF 122 transfers UE context for UE 101 to UPF 121. AMF 124 transfers UE context for UE 101 to CU 114. CU 114 transfers UE context for UE 101 to DU 114 which transfers UE context for UE 101 to RU 111. RU 111 wirelessly transfers UE context to UE 101. UE 101 and RU 111 wirelessly exchange data responsive to the UE context. RU 111 and DU 113 exchange the data responsive to the UE context. DU 113 and CU 114 exchange the data responsive to the UE context. CU 114 and UPF 121 exchange the data responsive to the UE context. UPF 121 exchanges the data with external systems responsive to the UE context.

In response to UE mobility, RU 111 hands UE 101 over to RU 112. UE 101 now transfers attachment signaling to RU 112. RU 112 transfers corresponding attachment signaling to DU 113. DU 113 transfers corresponding attachment signaling to CU 114. CU 114 detects the handover for RU 112 and transfers a corresponding handover event to NRF 123. In response to the handover subscription for UE 101, NRF 123 transfers a corresponding handover event notice for UE 101 and RU 112 to SMF 122. SMF 122 transfers a corresponding handover notice to PCF 125. PCF 125 identifies new policies for UE 101 after the handover to RU 112 and transfers the new policies to SMF 122. SMF 122 processes the new policies to develop new UE context for UE 101 like a new QoS level. AMF 124 and SMF 122 exchange new UE context. AMF 124 transfers new UE context for UE 101 to CU 114. CU 114 transfers new UE context for UE 101 to DU 114 which transfers new UE context for UE 101 to RU 112. RU 112 wirelessly transfers new UE context like the QoS level to UE 101. SMF 122 transfers new UE context for UE 101—like a new QoS level—to UPF 121. UE 101 and RU 112 wirelessly exchange data responsive to the new UE context. RU 112 and DU 113 exchange the data responsive to the new UE context. DU 113 and CU 114 exchange the data responsive to the new UE context. CU 114 and UPF 121 exchange the data responsive to the new UE context. UPF 121 exchanges the data with external systems responsive to the new UE context.

Figure 4:
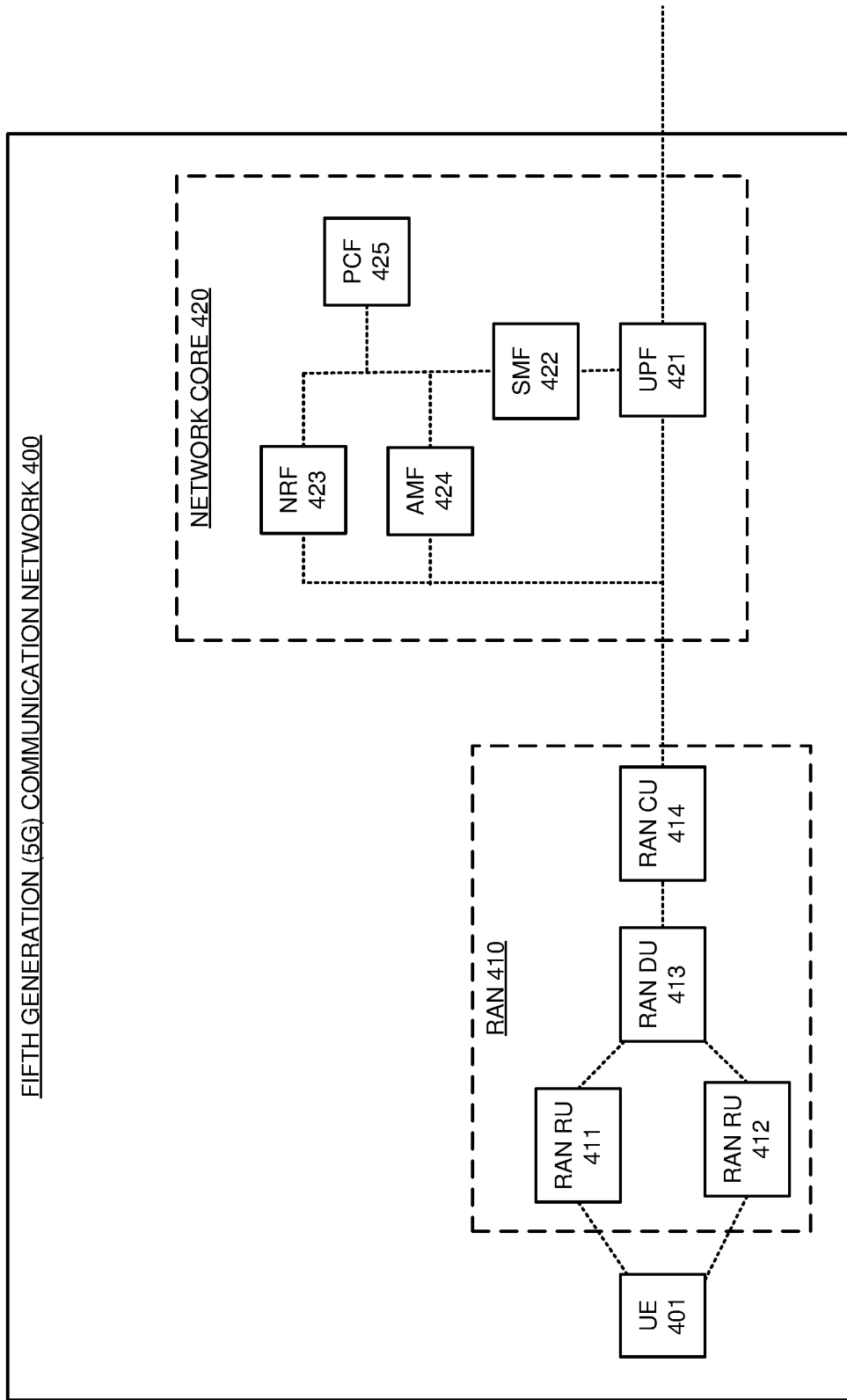
FIG. 4 illustrates a Fifth Generation (5G) wireless communication network to deliver a wireless data service responsive to a UE handover.

FIG. 4 illustrates Fifth Generation (5G) wireless communication network 400 to deliver a wireless data service responsive to a UE handover. 5G wireless communication network 400 comprises UE 401, Radio Access Network (RAN) 410, and network core 420. RAN 410 comprises RAN Radio Units (RUs) 411-412, RAN Distributed Unit (DU) 413, and RAN Centralized Unit (CU) 414. Network core 420 comprises User Plane Function (UPF) 421, Session Management Function (SMF) 422, Network Repository Function (NRF) 423, Access and Mobility Management Function (AMF) 424, and Policy Control Function (PCF) 425.

RAN CU 414 registers with NRF 423 to report handover events for RUs 411-412 on a per-UE basis. UE 401 transfers attachment signaling to RU 411. RU 411 transfers corresponding attachment signaling to DU 413, and DU 413 transfers corresponding attachment signaling to CU 414. CU 414 transfers corresponding attachment signaling to AMF 424. AMF 424 authenticates UE 401 and selects network names and slices for UE 401. AMF 424 queries PCF 425 for policies for UE 401, and PCF 425 returns policies for UE 401 to AMF 424. AMF 424 processes the policies to develop UE context for UE 401. AMF 424 and SMF 422 exchange UE context and SMF 422 typically adds UPF selections and network addresses. In response to the UE context for UE 401, SMF 422 subscribes to handover events for UE 401 from NRF 423. In response to the CU 414 registration for RU 411 handover reporting, NRF 423 requests handover events for UE 401 from CU 414.

SMF 422 transfers UE context for UE 401 to UPF 421. AMF 424 transfers UE context for UE 401 to CU 414. CU 414 transfers UE context for UE 401 to DU 413 which transfers UE context for UE 401 to RU 411. RU 411 transfers UE context to UE 401. UE 401 and RU 411 wirelessly exchange data responsive to the UE context. RU 411 and DU 413 exchange the data responsive to the UE context. DU 413 and CU 414 exchange the data responsive to the UE context. CU 414 and UPF 421 exchange the data responsive to the UE context. UPF 421 exchanges the data with external systems responsive to the UE context.

In response to UE mobility, RU 411 hands UE 401 over to RU 412. UE 401 now transfers attachment signaling to RU 412. RU 412 transfers corresponding attachment signaling to DU 413. DU 413 transfers corresponding attachment signaling to CU 414. CU 414 detects the handover for UE 401 from RU 411 to RU 412. In response to the NRF registration and UE request, CU 414 transfers a corresponding handover event for UE 401 from RU 411 to RU 412 to NRF 423. In response to the handover subscription for UE 401, NRF 423 transfers a corresponding handover event notice (UE 401 from RU 411 to RU 412) to SMF 422. SMF 422 transfers a corresponding handover notice (UE 401 from RU 411 to RU 412) to PCF 425. PCF 425 identifies new policies for UE 401 after the handover from RU 411 to RU 412 and transfers the new policies for UE 401 to SMF 422. SMF 422 processes the new policies to develop new UE context for UE 401 like new QoS signaling.

SMF 422 transfers new UE context for UE 401 to UPF 421. SMF 422 and AMF 424 exchange new UE context for UE 401. AMF 424 transfers new UE context for UE 401 to CU 414. CU 414 transfers new UE context for UE 401 to DU 414 which transfers new UE context for UE 401 to RU 412. RU 412 wirelessly transfers new UE context for UE 412. RU 412 wirelessly transfers new UE context for UE 401 to UE 401. UE 401 and RU 412 wirelessly exchange data responsive to the new UE context. RU 412 and DU 413 exchange the data responsive to the new UE context. DU 413 and CU 414 exchange the data responsive to the new UE context. CU 414 and UPF 421 exchange the data responsive to the new UE context. UPF 421 exchanges the data with external systems responsive to the new UE context. For example, UE 401 and UPF 421 may start downlink encryption for a downlink data burst in response to the handover to RU 412.

Figure 5:
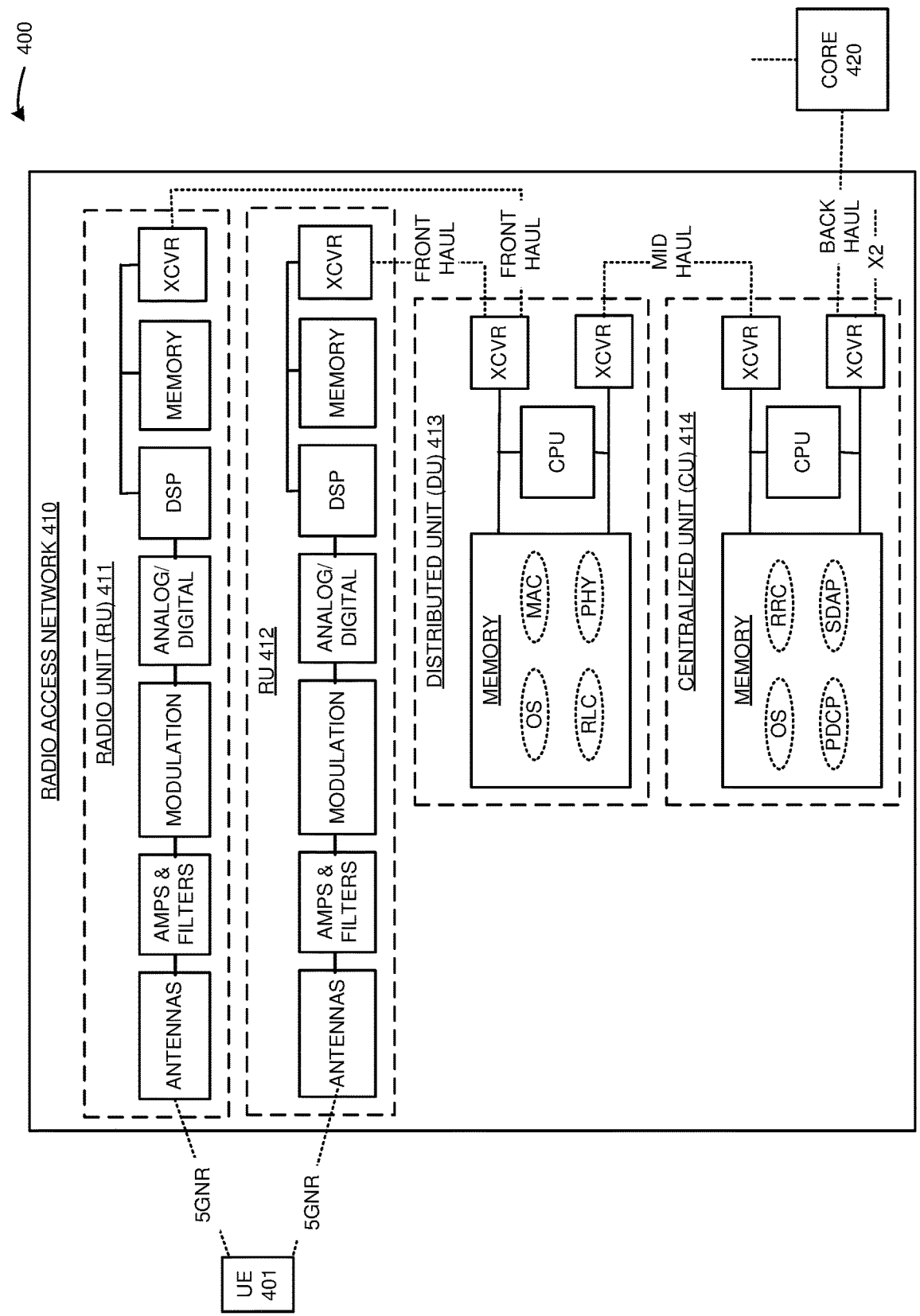
FIG. 5 illustrates a Radio Access Network (RAN) in the 5G wireless communication network that delivers the wireless data service responsive to the UE handover.

FIG. 5 illustrates Radio Access Network (RAN) 410 in 5G wireless communication network 400 that delivers the wireless data service responsive to the UE handover. RAN 410 comprises an example of RAN 110 on FIG. 1, although RAN 110 may differ. RAN 410 comprises Radio Units (RUs) 411-412, Distributed Unit (DU) 413, and Centralized Unit (CU) 414. RUs 411-412 comprise antennas, amplifiers, filters, modulation, analog-to-digital interfaces, DSP, memory, and transceivers (XCVRs) that are coupled over bus circuitry. DU 413 comprises memory, CPU, and transceivers that are coupled over bus circuitry. The memory in DU 413 stores an operating system and 5GNR network applications like Physical Layer (PHY), Media Access Control (MAC), and Radio Link Control (RLC). CU 414 comprises memory, CPU, and transceivers that are coupled over bus circuitry. The memory in CU 414 stores an operating system and network applications like Packet Data Convergence Protocol (PDCP), Service Data Adaptation Protocol (SDAP), and Radio Resource Control (RRC).

In DU 413, RLC functions comprise Automatic Repeat Request (ARQ), sequence numbering and resequencing, segmentation and resegmentation. MAC functions comprise buffer status, power control, channel quality, Hybrid Automatic Repeat Request (HARQ), user identification, random access, user scheduling, and QoS. PHY functions comprise packet formation/deformation, guard-insertion/guard-deletion, parsing/de-parsing, control insertion/removal, interleaving/de-interleaving, Forward Error Correction (FEC) encoding/decoding, channel coding/decoding, channel estimation/equalization, and rate matching/de-matching, scrambling/descrambling, modulation mapping/de-mapping, layer mapping/de-mapping, precoding, Resource Element (RE) mapping/de-mapping, Fast Fourier Transforms (FFTs)/Inverse FFTs (IFFTs), and Discrete Fourier Transforms (DFTs)/Inverse DFTs (IDFTs).

In CU 414, PDCP functions include security ciphering, header compression and decompression, sequence numbering and re-sequencing, de-duplication. SDAP functions include QoS marking and flow control. RRC functions include authentication, security, handover control, status reporting, QoS, network broadcasts and pages, and network selection.

UE 401 is wirelessly coupled to the antennas in RUs 411-412 over 5GNR links. Transceivers in RUs 411-412 are coupled to transceivers in DU 413 over fronthaul links like enhanced Common Public Radio Interface (eCPRI). Transceivers in DU 413 are coupled to transceivers in CU 414 over mid-haul links. Transceivers in CU 414 are coupled to network core 420 over backhaul links. The DSP and CPU in RUs 411-412, DU 413, and CU 414 execute their operating systems, radio applications, PHY, MAC, RLC, PDCP, SDAP, and RRC to exchange 5GNR signals with UE 401, exchange 5GC signaling and data with network core 420, and exchange X2 signaling and data with other CUs.

In RUs 411-412, the antennas receive wireless 5GNR signals from UE 401 that transport uplink 5GNR signaling and data. The antennas transfer corresponding electrical uplink signals through duplexers to the amplifiers. The amplifiers boost the electrical uplink signals for filters which attenuate unwanted energy. Demodulators down-convert the filtered uplink signals from their carrier frequency. The analog/digital interfaces convert the demodulated analog uplink signals into digital uplink signals for the DSPs. The DSPs recover uplink 5GNR symbols from the uplink digital signals and transfer the uplink 5GNR symbols to DU 413. In DU 413, the CPU executes the network applications (PHY, MAC, and RLC) to process the uplink 5GNR symbols and recover the uplink 5GNR signaling and data. The RLC in DU 413 transfers UL data units to the PDCP in CU 414. In CU 414, the CPU executes the network applications (PDCP, SDAP, and RRC) to process the uplink data units and recover the uplink 5GNR signaling and data. The RRC processes the uplink 5GNR signaling, downlink N2 signaling, and X2 signaling to generate new downlink 5GNR signaling, new uplink N2 signaling, and new X2 signaling. The RRC transfers the new uplink N2 signaling to network core 420 and the X2 signaling to other CUs. The SDAP exchanges N3 data to network core 420.

In CU 414, the RRC receives N2 signaling from network core 420 and X2 signaling from the other CUs. The SDAP receives downlink data from network core 420 and X2 data from other CUs. The 5GNR network applications (RRC, SDAP, PDCP) process the new downlink 5GNR signaling and data to generate corresponding downlink data units. The PDCP in CU 414 transfers the downlink data units to the RLC in DU 413. The 5GNR network applications (RLC, MAC, PHY) in DU 413 process the downlink data units to generate corresponding 5GNR symbols. DU 413 transfers the downlink 5GNR symbols to RUs 411-412. In RUs 411-412, the DSP processes the downlink 5GNR symbols to generate corresponding digital signals for the analog-to-digital interfaces. The analog-to-digital interfaces convert the digital signals into analog signals for modulation. Modulation up-converts the analog signals to their carrier frequency. The amplifiers boost the modulated signals for the filters which attenuate unwanted out-of-band energy. The filters transfer the filtered electrical signals through duplexers to the antennas. The filtered electrical signals drive the antennas to emit corresponding wireless signals to 5GNR UE 401 that transport the downlink 5GNR signaling and data.

The RRC in CU 414 registers with NRF 423 in network core 420 to report handover events for RUs 411-412 on a per-UE basis. UE 401 transfers attachment signaling to RU 411. RU 411 transfers corresponding attachment signaling to the PHY in DU 413. The PHY interacts with the MAC which interacts with the RLC. The RLC in DU 413 transfers corresponding attachment signaling to the PDCP in CU 414. The PDCP interacts with the RRC and the SDAP. The RRC in CU 414 transfers corresponding N2 signaling for UE 401 to AMF 424 in network core 420. The SDAP in CU 414 exchanges N3 data for UE 401 with UPF 421 in network core 420. The RRC in CU 414 receives a request for handover events for UE 401 from NRF 423 in network core 420.

The RRC in CU 414 receives UE context for UE 401 from AMF 424 in network core 420. The AMF interacts with the PDCP. The PDCP in CU 414 transfers UE context for UE 401 to the RLC in DU 413, and the RLC interacts with the MAC which interacts with the PHY. The PHY in DU 413 transfers UE context for UE 401 to RU 411. RU 411 wirelessly transfers UE context to UE 401. UE 401 and RU 411 wirelessly exchange data responsive to the UE context. RU 411 and the PHY in DU 413 exchange the data responsive to the UE context. The PHY interacts with the MAC which interacts with the RLC. The RLC in DU 413 and the PDCP in CU 414 exchange the data responsive to the UE context. The PDCP interacts with the SDAP. The SDAP in CU 414 and UPF 421 in network core 420 exchange the data responsive to the UE context.

In response to UE mobility, the RRC in CU 414 hands UE 101 over from RU 411 to RU 412. UE 401 now transfers attachment signaling to RU 412. RU 412 transfers corresponding attachment signaling to the PHY in DU 413. The PHY interacts with the MAC which interacts with the RLC. The RLC in DU 413 transfers corresponding attachment signaling to the PDCP in CU 414. The PDCP interacts with the RRC. In response to the NRF registration and the NRF request, the RRC in CU 414 transfers a corresponding handover event (UE 401 from RU 411 to RU 412) to NRF 423. The RRC in CU 414 receives new UE context for UE 401 from AMF 424 in network core 420. The RRC interacts with the PDCP. The PDCP in CU 414 transfers new UE context for UE 401 to the RLC in DU 413. The RLC interacts with the MAC which interacts with the PHY. The PHY in DU 413 transfers new UE context for UE 401 to RU 412. RU 412 wirelessly transfers new UE context for UE 401 to UE 401. UE 401 and RU 412 wirelessly exchange data responsive to the new UE context. RU 412 and the PHY in DU 413 exchange the data responsive to the new UE context. The PHY interacts with the MAC which interacts with the RLC. The RLC in DU 413 and the PDCP in CU 414 exchange the data responsive to the new UE context. The PDCP interacts with the SDAP. The SDAP in CU 414 and UPF 421 in network core 420 exchange the data responsive to the new UE context.

Figure 6:
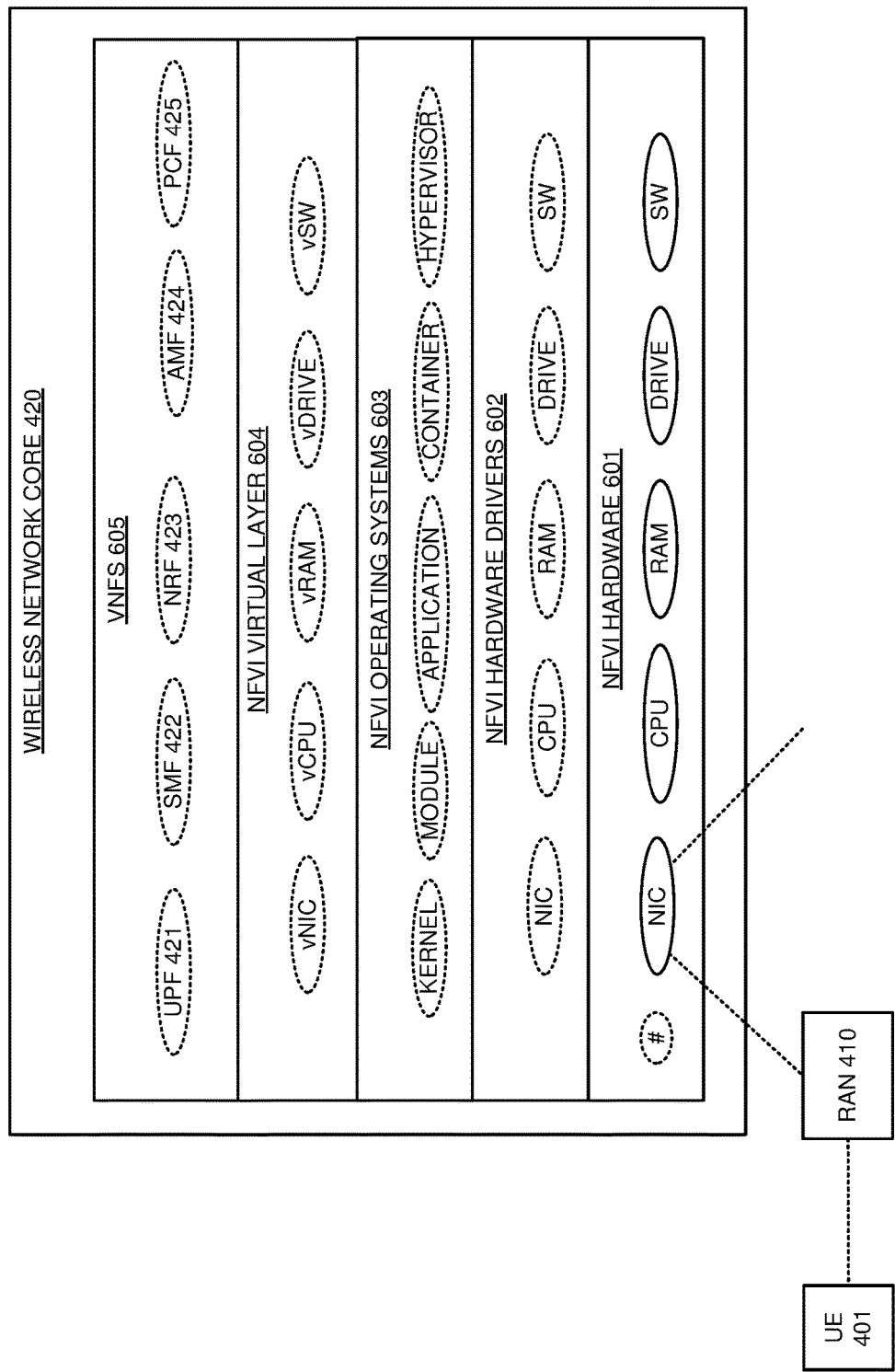
FIG. 6 illustrates a wireless network core in the 5G wireless communication network that delivers the wireless data service responsive to the UE handover.

FIG. 6 illustrates wireless network core 420 in 5G wireless communication network 400 that delivers the wireless data service responsive to the UE handover. Wireless network core 420 comprises an example of network core 120 on FIG. 1, although core 120 may differ. Wireless network core 420 comprises Network Function Virtualization Infrastructure (NFVI) hardware 601, NFVI hardware drivers 602, NFVI operating systems 603, NFVI virtual layer 604, and NFVI Virtual Network Functions (VNFs) 605. NFVI hardware 601 comprises Network Interface Cards (NICs), CPU, RAM, Flash/Disk Drives (DRIVE), and Data Switches (SW). NFVI hardware drivers 602 comprise software that is resident in the NIC, CPU, RAM, DRIVE, and SW. NFVI operating systems 603 comprise kernels, modules, applications, containers, hypervisors, and the like. NFVI virtual layer 604 comprises vNIC, vCPU, vRAM, vDRIVE, and vSW. NFVI VNFs 605 comprise UPF 421, SMF 422, NRF 423, AMF 424, and PCF 425. Other VNFs like Authentication Server Function (AUSF), Unified Data Manager (UDM), Network Exposure Function (NEF), Network Slice Selection Function (NSSF), are typically present but are omitted for clarity. Wireless network core 420 may be located at a single site or be distributed across multiple geographic locations. The NIC are coupled to CU 414 in RAN 410 and external systems. NFVI hardware 601 executes NFVI hardware drivers 602, NFVI operating systems 603, NFVI virtual layer 604, and NFVI VNFs 605 to serve UE 401 over RAN 410.

Figure 7:
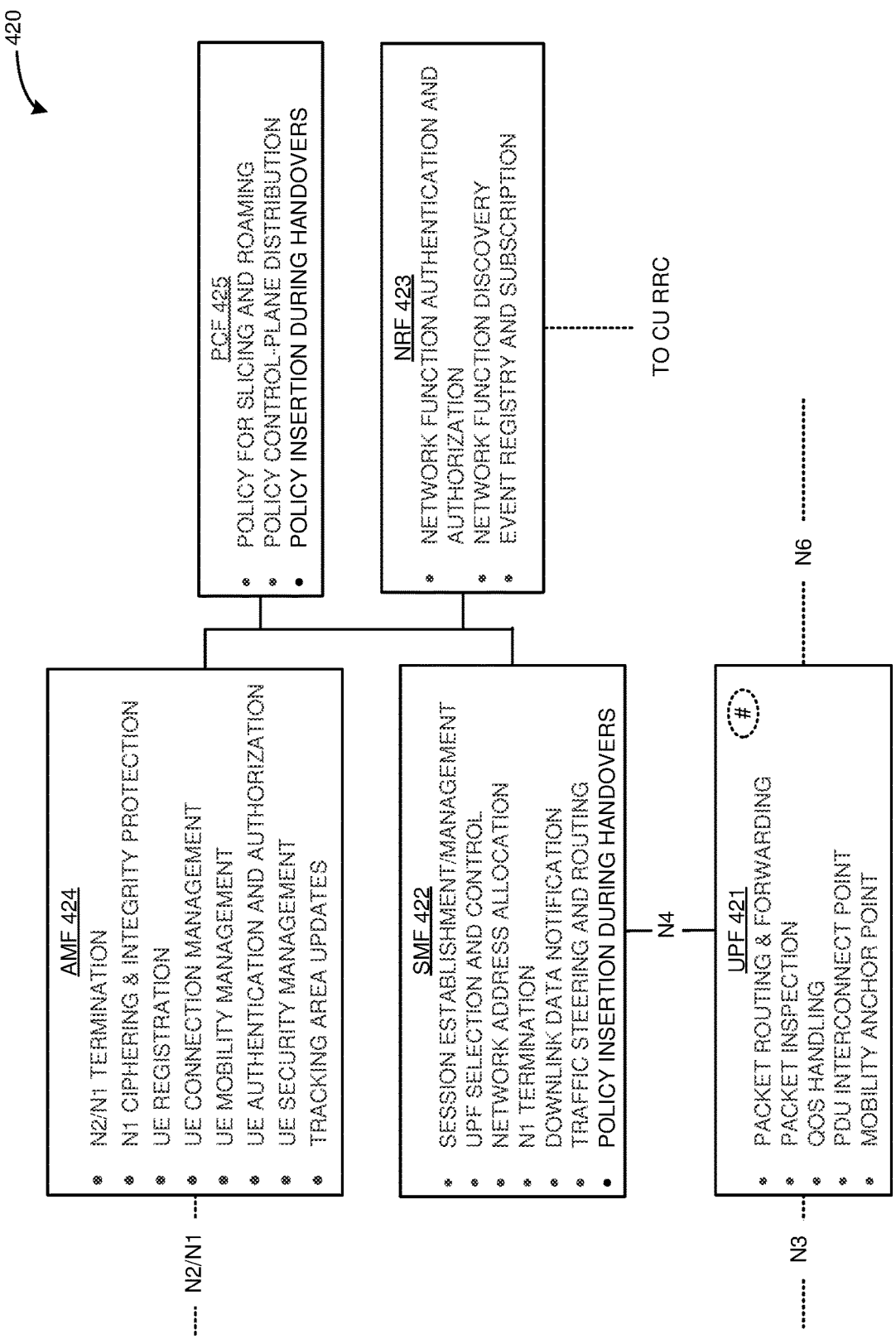
FIG. 7 illustrates detailed functions of the wireless network core in the 5G wireless communication network that delivers the wireless data service responsive to the UE handover.

FIG. 7 further illustrates wireless network core 420 in 5G wireless communication network 400 that delivers the wireless data service responsive to the UE handover. UPF 421 performs packet routing & forwarding, packet inspection, QoS handling, PDU interconnection, and mobility anchoring. SWF 422 performs session establishment/management, network address allocation, N1 termination, downlink data notification, and traffic steering and routing. NRF 423 performs network function authentication and authorization, selection, security, and event registration: subscriptions. AMF 424 performs N2/N1 termination, N1 ciphering & integrity protection, UE registration, SMF/PCF selection, UE connection/mobility management, UE authentication and authorization, UE security management, and tracking area updates. PCF 425 performs policy framework implementation for slices and roaming, policy control-plane distribution, and handover policy insertion. Although not shown for clarity, an AUSF performs UE authentication with Authentication and Key Agreement (AKA) credentials and handles UE authorizations. A UDM handles UE context, UE subscription data, and UE authentication keys. An NSSF performs network slice selection per UE, network slice authorization per UE, and AMF reselection per UE.

In operation, NRF 423 receives a registration from the RRC in CU 414 to report handover events for RUs 411-412 on a per-UE basis. AMF 424 receives N2 attachment signaling from CU 414 for UE 401. AMF 424 authenticates UE 401 and selects network names and slices for UE 401. AMF 424 queries PCF 425 for policies for UE 401, and PCF 425 returns policies for UE 401 to AMF 424. AMF 424 processes the policies to develop UE context for UE 401 like QoS parameters. AMF 424 and SMF 422 exchange UE context, and SMF 422 adds a UPF 421 selection and network addresses. In response to the UE context for UE 401, SMF 422 subscribes to handover events for UE 401 from NRF 423. In response to the CU 414 registration for handover reporting, NRF 423 requests handover events for UE 401 from CU 414. SMF 422 transfers UE context for UE 401 to UPF 421. AMF 424 transfers UE context for UE 401 to the RRC in CU 414. The SDAP in CU 414 and UPF 421 exchange the data responsive to the UE context. UPF 421 exchanges the data with external systems responsive to the UE context.

The RRC in CU 414 detects the handover for UE 401 from RU 411 to RU 412. In response to the NRF registration and request, the RRC in CU 414 transfers a corresponding handover event to NRF 423 that characterizes the handover of UE 401 from RU 411 to RU 412. In response to the handover subscription for UE 401, NRF 423 transfers a corresponding handover event notice for UE 401 to SMF 422. SMF 422 transfers a corresponding handover notice to PCF 425. PCF 425 identifies new policies for UE 401 responsive to the handover of UE 401 from RU 411 to RU 412. PCF 425 transfers the new policies for UE 401 to SMF 422. SMF 422 processes the new policies to develop new UE context for UE 401 like new QoS signaling. SMF 422 and AMF 424 exchange new UE context. SMF 422 transfers new UE context for UE 401 to UPF 421. AMF 424 transfers new UE context for UE 401 to the RRC in CU 414. The SDAP in CU 414 and UPF 421 exchange the data responsive to the new UE context. UPF 421 exchanges the data with external systems responsive to the new UE context.

Figure 8:
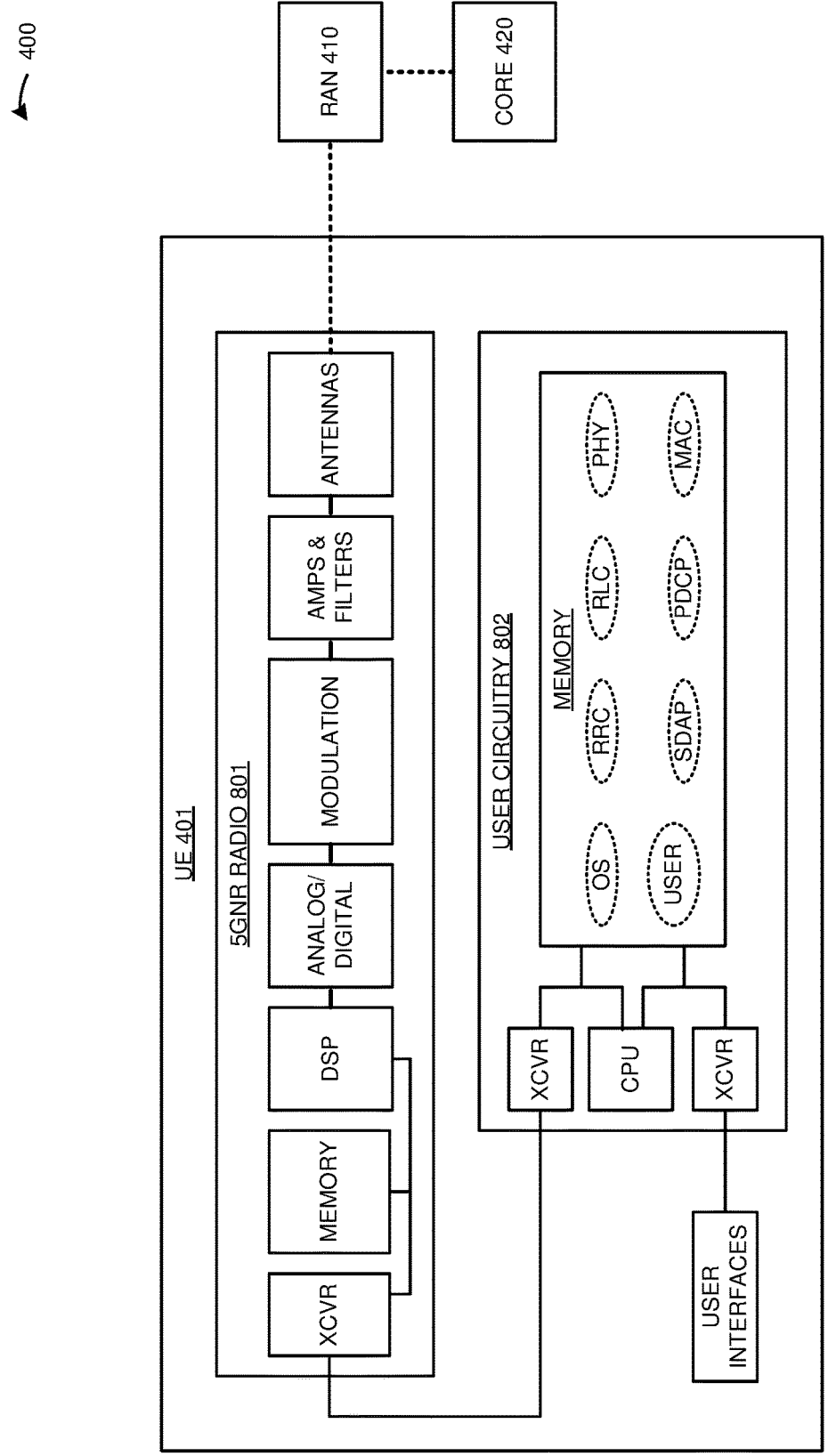
FIG. 8 illustrates the UE that receives the wireless data service from the 5G wireless communication network responsive to the UE handover.

FIG. 8 illustrates UE 401 that receives the wireless data service from 5G wireless communication network 400 responsive to the UE handover. UE 401 comprises an example of UE 101, although UE 101 may differ. UE 401 comprises 5GNR radio 801 and user circuitry 802. 5GNR radio 801 comprises antennas, amplifiers, filters, modulation, analog-to-digital interfaces, DSP, memory, and transceivers that are coupled over bus circuitry. User circuitry 802 comprises memory, CPU, user interfaces, and transceivers that are coupled over bus circuitry. The memory in user circuitry 802 stores an operating system, user applications (USER), and 5GNR network applications for PHY, MAC, RLC, PDCP, SDAP, and RRC. The antennas in 5GNR radio 801 are wirelessly coupled to RAN 410 over 5GNR links. Transceivers in 5GNR radio 801 are coupled to a transceiver in user circuitry 802. A transceiver in user circuitry 802 is typically coupled to the user interfaces like displays, controllers, memory, and the like. The CPU in user circuitry 802 executes the operating system, PHY, MAC, RLC, PDCP, SDAP, and RRC to exchange 5GNR signaling and data with RAN 410 over 5GNR radio 801.

Figure 9:
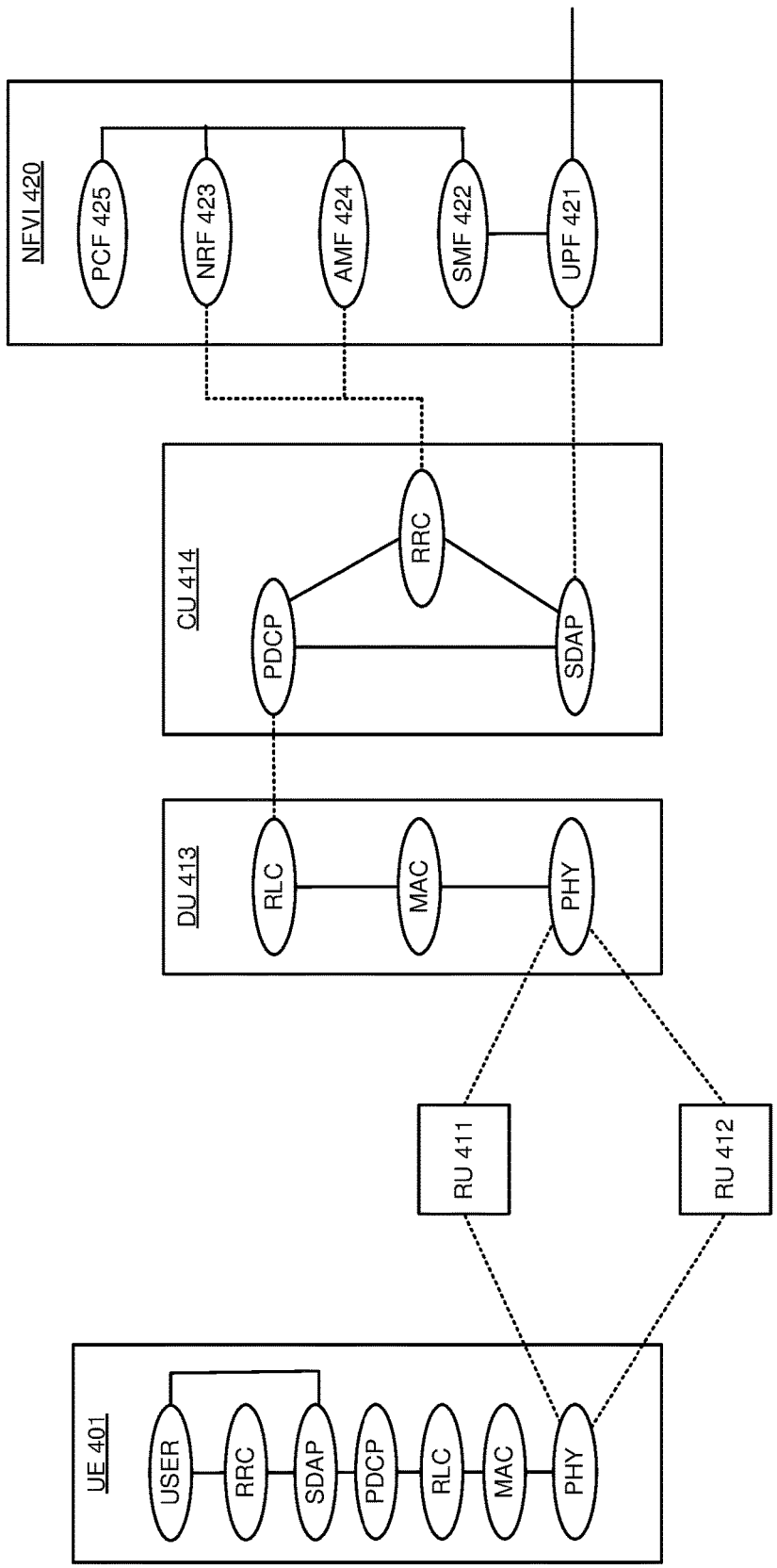
FIG. 9 illustrates the operation of the 5G wireless communication network to deliver the wireless data service responsive to the UE handover.

FIG. 9 illustrates the operation of 5G wireless communication network 400 to deliver the wireless data service responsive to the UE handover. The operation is exemplary and may differ in other examples. The RRC in CU 414 registers with NRF 423 to report handover events for RUs 411-412 on a per-UE basis. The RRC in UE 401 transfers attachment signaling to RU 411 over the PDCP, RLC, MAC, and PHY in UE 401. RU 411 transfers corresponding attachment signaling to the PHY in DU 413 which interacts with the MAC which interacts with the RLC. The RLC in DU 413 transfers corresponding attachment signaling to the PDCP in CU 414 which interacts with the RRC. The RRC in CU 414 transfers corresponding attachment signaling to AMF 424.

AMF 424 authenticates UE 401 and selects network names and slices for UE 401. AMF 424 queries PCF 425 for policies for UE 401, and PCF 425 returns policies for UE 401 to AMF 424. AMF 424 processes the policies to develop UE context for UE 401 like QoS levels. AMF 424 and SMF 422 exchange UE context, and SMF 422 adds a UPF 421 selection and network addresses. In response to the UE context for UE 401, SMF 422 subscribes to handover events for UE 401 from NRF 423. In response to the CU 414 registration for handover reporting, NRF 423 requests handover events for UE 401 from the RRC in CU 414.

SMF 422 transfers UE context for UE 401 to UPF 421. AMF 424 transfers UE context for UE 401 to the RRC in CU 414. The RRC in CU 414 transfers UE context for UE 401 to the PDCP which transfers UE context to the RLC in DU 413. The RLC in DU 413 interacts with the MAC which interacts with the PHY. The PHY in DU 413 transfers UE context for UE 401 to RU 411. RU 411 wirelessly transfers UE context to the RRC in UE 401 over the PHY, MAC, RLC, and PDCP in UE 401.

The SDAP in UE 401 and RU 411 wirelessly exchange data responsive to the UE context over the PDCP, RLC, MAC, and PHY in UE 401. RU 411 and the PHY in DU 413 exchange the data responsive to the UE context, and the PHY exchanges the data with the MAC which exchanges the data with the RLC. The RLC in DU 413 and the PDCP on CU 414 exchange the data responsive to the UE context. In CU 414, the PDCP in exchanges the data with the SDAP, and the SDAP exchange the data with UPF 421 responsive to the UE context. UPF 421 exchanges the data with external systems responsive to the UE context. In some examples, the SDAP is omitted from CU 414, and the PDCP in exchanges the N3 data with UPF 421 responsive to the UE context.

In response to UE mobility, RU 411 hands UE 101 over to RU 412 under RRC control from CU 414. UE 401 now transfers attachment signaling to RU 412. RU 412 transfers corresponding attachment signaling to the PHY in DU 413 which transfers attachment signaling to the MAC which transfers attachment signaling to the RLC. The RLC in DU 413 transfers corresponding attachment signaling to the PDCP in CU 114 which transfers corresponding attachment signaling to the RRC. The RRC in CU 414 detects the handover for UE 401 from RU 111 to RU 112. In response to the NRF registration and NRF request for UE 401, the RRC in CU 414 transfers a corresponding handover event to NRF 423 that characterizes the handover of UE 401 from RU 411 to RU 412. In response to the handover subscription for UE 401, NRF 423 transfers a corresponding handover event notice for UE 401 to SMF 422. SMF 422 transfers a corresponding handover notice to PCF 425. PCF 425 identifies new policies for UE 401 in response to the handover from RU 111 to RU 412. PCF 425 transfers the new policies for UE 401 to SMF 422. SMF 422 processes the new policies to develop new UE context for UE 401.

SMF 422 and AMF 424 exchange new UE context. SMF 422 transfers new UE context for UE 401 to UPF 421. AMF 424 transfers new UE context for UE 401 to the RRC in CU 414. The RRC in CU 414 transfers new UE context for UE 401 to the PDCP which transfers new UE context to the RLC in DU 413. The RLC in DU 413 transfers new UE context for UE 401 to the MAC which transfers new UE context to the PHY. The PHY transfers new UE context to RU 412. RU 412 wirelessly transfers new UE context for UE 401 to the RRC in UE 401 over the PHY, MAC, RLC, and PDCP in UE 401. The SDAP in UE 401 and RU 412 wirelessly exchange data responsive to the new UE context over the PDCP, RLC, MAC, and PHY in UE 401. RU 412 and the PHY in DU 413 exchange the data responsive to the new UE context. The PHY exchanges the data with the MAC which exchanges the data with the RLC. The RLC in DU 413 and the PDCP in CU 414 exchange the data responsive to the new UE context. The PDCP exchanges the data with the SDAP. The SDAP in CU 414 and UPF 421 exchange the data responsive to the new UE context. UPF 421 exchanges the data with external systems responsive to the new UE context. In some examples, the SDAP is omitted from CU 414, and the PDCP exchanges N3 data with UPF 421 responsive to the UE context.

The wireless data network circuitry described above comprises computer hardware and software that form special-purpose network circuitry to deliver to wireless data service responsive to UE handovers. The computer hardware comprises processing circuitry like CPUs, DSPs, GPUs, transceivers, bus circuitry, and memory. To form these computer hardware structures, semiconductors like silicon or germanium are positively and negatively doped to form transistors. The doping comprises ions like boron or phosphorus that are embedded within the semiconductor material. The transistors and other electronic structures like capacitors and resistors are arranged and metallically connected within the semiconductor to form devices like logic circuitry and storage registers. The logic circuitry and storage registers are arranged to form larger structures like control units, logic units, and Random-Access Memory (RAM). In turn, the control units, logic units, and RAM are metallically connected to form CPUs, DSPs, GPUs, transceivers, bus circuitry, and memory.

In the computer hardware, the control units drive data between the RAM and the logic units, and the logic units operate on the data. The control units also drive interactions with external memory like flash drives, disk drives, and the like. The computer hardware executes machine-level software to control and move data by driving machine-level inputs like voltages and currents to the control units, logic units, and RAM. The machine-level software is typically compiled from higher-level software programs. The higher-level software programs comprise operating systems, utilities, user applications, and the like. Both the higher-level software programs and their compiled machine-level software are stored in memory and retrieved for compilation and execution. On power-up, the computer hardware automatically executes physically-embedded machine-level software that drives the compilation and execution of the other computer software components which then assert control. Due to this automated execution, the presence of the higher-level software in memory physically changes the structure of the computer hardware machines into special-purpose network circuitry to deliver to wireless data service responsive to UE handovers.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. Thus, the invention is not limited to the specific embodiments described above, but only by the following claims and their equivalents.

What is claimed is:

1. A method of operating a wireless communication system to deliver a wireless data service to User Equipment (UE) responsive to a handover of the UE, the method comprising:
   a Radio Access Network Centralized Unit (RAN CU) transferring a handover registration to a Network Repository Function (NRF);
   a Session Management Function (SMF) transferring a handover subscription for the UE to the NRF;
   the NRF receiving the handover registration and the handover subscription;
   the RAN CU detecting a handover of the UE and responsively transferring a handover notice for the UE to the NRF;
   the NRF receiving the handover notice for the UE, and in response to the handover subscription for the UE from the SMF, transferring the handover notice for the UE to the SMF; and
   the SMF modifying the wireless data service for the UE responsive to the handover notice for the UE.

2. The method of claim 1 wherein the RAN CU detecting the handover of the UE comprises detecting the handover of the UE to a specific Radio Unit (RU).

3. The method of claim 1 wherein the RAN CU detecting the handover of the UE comprises detecting the handover of the UE to a specific set of Radio Units (RUs).

4. The method of claim 1 further comprising:
   a Policy Control Function (PCF) selecting a policy for the UE; and wherein
   the SMF modifying the wireless data service for the UE responsive to the handover notice for the UE comprises transferring the handover notice for the UE to the PCF; and further comprising:
   the PCF modifying the policy for the UE responsive to the handover notice and signaling the modified policy.

5. The method of claim 1 further comprising:
   the SMF signaling a User Plane Function (UPF) to deliver the wireless data service to the UE;
   the UPF exchanging user data for the UE to deliver the wireless data service responsive to the SMF signaling; and wherein the SMF modifying the wireless data service for the UE responsive to the handover notice for the UE comprises instructing the UPF to deliver a modified wireless data service to the UE; and the UPF exchanging additional user data for the UE to deliver the modified wireless data service to the UE responsive to the SMF instruction.

6. The method of claim 1 further comprising:

a Policy Control Function (PCF) selecting a policy for the UE;

the SMF signaling a User Plane Function (UPF) to deliver the wireless data service to the UE per the policy;

the UPF exchanging user data for the UE to deliver the wireless data service per the policy responsive to the SMF signaling; and wherein the SMF modifying the wireless data service for the UE responsive to the handover notice for the UE comprises transferring the handover notice for the UE to the PCF;

the PCF modifying the policy for the UE;

the SMF signaling the UPF to deliver the wireless data service to the UE per the modified policy; and the UPF exchanging additional user data for the UE to deliver the wireless data service per the modified policy.

7. The method of claim 1 further comprising:

the SMF signaling a User Plane Function (UPF) to deliver the wireless data service to the UE;

the UPF exchanging user data for the UE to deliver the wireless data service responsive to the SMF signaling; and wherein the SMF modifying the wireless data service for the UE responsive to the handover notice for the UE comprises instructing the UPF to encrypt the wireless data service for the UE; and further comprising the UPF encrypting and decrypting additional user data and exchanging the encrypted additional user data with the UE to encrypt the wireless data service for the UE responsive to the SMF instruction.

8. The method of claim 1 wherein the RAN CU detecting the handover of the UE and transferring the handover notice for the UE to the NRF comprises the RAN CU executing a Radio Resource Control (RRC) and the RRC detecting the handover of the UE and transferring the handover notice for the UE to the NRF.

9. The method of claim 1 further comprising:

the SMF signaling a User Plane Function (UPF) to deliver the wireless data service to the UE;

the UPF exchanging user data for the UE to deliver the wireless data service to the UE responsive to the SMF signaling; and the RAN CU executing a Packet Data Convergence Protocol (PDCP) and the PDCP exchanging the user data for the UE with the UPF.

10. The method of claim 1 further comprising:

the SMF signaling a User Plane Function (UPF) to deliver the wireless data service to the UE;

the UPF exchanging user data for the UE to deliver the wireless data service to the UE responsive to the SMF signaling; and the RAN CU executing a Service Data Adaption Protocol (SDAP) and the SDAP exchanging the user data for the UE with the UPF.

11. A wireless communication system to deliver a wireless data service to User Equipment (UE) responsive to a handover of the UE, the wireless communication system comprising:

a Radio Access Network Centralized Unit (RAN CU) configured to transfer a handover registration to a Network Repository Function (NRF);

a Session Management Function (SMF) configured to transfer a handover subscription for the UE to the NRF;

the NRF configured to receive the handover registration and the handover subscription;

the RAN CU configured to detect a handover of the UE and responsively transfer a handover notice for the UE to the NRF;

the NRF configured to receive the handover notice for the UE, and in response to the handover subscription for the UE from the SMF, transfer the handover notice for the UE to the SMF; and the SMF configured to modify the wireless data service for the UE responsive to the handover notice for the UE.

12. The wireless communication system of claim 11 wherein the RAN CU is configured to detect the handover of the UE to a specific Radio Unit (RU).

13. The wireless communication system of claim 11 wherein the RAN CU is configured to detect the handover of the UE to a specific set of Radio Units (RUs).

14. The wireless communication system of claim 11 further comprising:

a Policy Control Function (PCF) configured to select a policy for the UE; and wherein the SMF is configured to transfer the handover notice for the UE to the PCF; and further comprising:

the PCF configured to modify the policy for the UE responsive to the handover notice and signal the modified policy.

15. The wireless communication system of claim 11 further comprising:

the SMF configured to signal a User Plane Function (UPF) to deliver the wireless data service to the UE;

the UPF configured to exchange user data for the UE to deliver the wireless data service responsive to the SMF signaling; and wherein the SMF is configured to instruct the UPF to deliver a modified wireless data service to the UE; and the UPF is configured to exchange additional user data for the UE to deliver the modified wireless data service to the UE responsive to the SMF instruction.

16. The wireless communication system of claim 11 further comprising:

a Policy Control Function (PCF) configured to select a policy for the UE;

the SMF configured to signal a User Plane Function (UPF) to deliver the wireless data service to the UE per the policy;

the UPF configured to exchange user data for the UE to deliver the wireless data service per the policy responsive to the SMF signaling; and wherein the SMF is configured to transfer the handover notice for the UE to the PCF;

the PCF is configured to modify the policy for the UE;

the SMF is configured to signal the UPF to deliver the wireless data service to the UE per the modified policy; and the UPF is configured to exchange additional user data for the UE to deliver the wireless data service per the modified policy.

17. The wireless communication system of claim 11 further comprising:

the SMF configured to signal a User Plane Function (UPF) to deliver the wireless data service to the UE;

the UPF configured to exchange user data for the UE to deliver the wireless data service responsive to the SMF signaling; and wherein the SMF is configured to instruct the UPF to encrypt the wireless data service for the UE; and further comprising the UPF configured to encrypt and decrypt additional user data and exchange the encrypted additional user data with the UE to encrypt the wireless data service for the UE responsive to the SMF instruction.

18. The wireless communication system of claim 11 wherein the RAN CU is configured to execute a Radio Resource Control (RRC) and the RRC is configured to detect the handover of the UE and transfer the handover notice for the UE to the NRF.

19. The wireless communication system of claim 11 further comprising:

the SMF configured to signal a User Plane Function (UPF) to deliver the wireless data service to the UE;

the UPF configured to exchange user data for the UE to deliver the wireless data service to the UE responsive to the SMF signaling; and the RAN CU is configured to execute a Packet Data Convergence Protocol (PDCP) and the PDCP is configured to exchange the user data for the UE with the UPF.

20. The wireless communication system of claim 11 further comprising:

the SMF configured to signal a User Plane Function (UPF) to deliver the wireless data service to the UE;

the UPF is configured to exchange user data for the UE to deliver the wireless data service to the UE responsive to the SMF signaling; and the RAN CU is configured to execute a Service Data Adaption Protocol (SDAP) and the SDAP is configured to exchange the user data for the UE with the UPF.

* * * * *